(12) United States Patent
García et al.

(10) Patent No.: US 11,640,707 B2
(45) Date of Patent: *May 2, 2023

(54) REDUCING SCALE ESTIMATE ERRORS IN SHELF IMAGES

(71) Applicant: Nielsen Consumer LLC, New York, NY (US)

(72) Inventors: Antonio Hurtado García, Valladolid (ES); Francisco Javier Martin, Valladolid (ES); Diego García Morate, Valladolid (ES)

(73) Assignee: NIELSEN CONSUMER LLC, Chicago, IL (US)

( * ) Notice: Subject to any disclaimer, the term of this patent is extended or adjusted under 35 U.S.C. 154(b) by 220 days.

This patent is subject to a terminal disclaimer.

(21) Appl. No.: 17/201,909

(22) Filed: Mar. 15, 2021

(65) Prior Publication Data

US 2021/0201019 A1   Jul. 1, 2021

Related U.S. Application Data

(63) Continuation of application No. 16/401,744, filed on May 2, 2019, now Pat. No. 10,949,665, which is a
(Continued)

(51) Int. Cl.
*G06K 9/00* (2022.01)
*G06F 16/583* (2019.01)
(Continued)

(52) U.S. Cl.
CPC ....... *G06K 9/00536* (2013.01); *G06F 16/583* (2019.01); *G06T 11/60* (2013.01);
(Continued)

(58) Field of Classification Search
CPC .............. G06F 16/583; G06K 9/00536; G06Q 10/087; G06T 11/60; G06T 2207/30128;
(Continued)

(56) References Cited

U.S. PATENT DOCUMENTS 5,920,658 A   7/1999   Yamagata et al.
8,340,420 B2  12/2012  Smith et al.
(Continued)

OTHER PUBLICATIONS

Criminisi, "Single-View Metrology: Algorithms and Applications," invited paper, Microsoft Research, 2002, 16 pages.
(Continued)

*Primary Examiner* — Katrina R Fujita
(74) *Attorney, Agent, or Firm* — Hanley, Flight & Zimmerman, LLC (57) ABSTRACT

Example image processing methods, apparatus/systems and articles of manufacture are disclosed herein. An example apparatus includes an image recognition application to identify matches between stored patterns and objects detected in a shelf image, where the shelf image has a shelf image scale estimate. The example apparatus further includes a scale corrector to calculate deviation values between sizes of (A) a first set of the objects detected in the shelf image and (B) a first set of the stored patterns matched with the first set of the objects and reduce an error of the shelf image scale estimate by calculating a scale correction value for the shelf image scale estimate based on the deviation values.

20 Claims, 6 Drawing Sheets

Related U.S. Application Data continuation of application No. 15/317,674, filed as application No. PCT/IB2016/001664 on Oct. 28, 2016, now Pat. No. 10,282,607.

(51) Int. Cl.

| | |
|---|---|
| *G06V 10/25* | (2022.01) |
| *G06V 10/75* | (2022.01) |
| *G06V 20/00* | (2022.01) |
| *G06V 20/10* | (2022.01) |
| *G06T 11/60* | (2006.01) |
| *G06V 20/68* | (2022.01) |
| *G06Q 10/08* | (2012.01) |
| *G06Q 10/087* | (2023.01) |

(52) U.S. Cl.
CPC ............ *G06V 10/25* (2022.01); *G06V 10/754* (2022.01); *G06V 20/00* (2022.01); *G06V 20/10* (2022.01); *G06Q 10/087* (2013.01); *G06T 2207/30128* (2013.01); *G06V 20/68* (2022.01); *G06V 2201/06* (2022.01); *G06V 2201/09* (2022.01)

(58) Field of Classification Search
CPC ...... G06V 10/25; G06V 10/754; G06V 20/00; G06V 20/10; G06V 20/68; G06V 2201/06; G06V 2201/09
See application file for complete search history.

(56) References Cited

U.S. PATENT DOCUMENTS

| | | |
|---|---|---|
| 8,536,167 B2 | 9/2013 | Stroman et al. |
| 8,705,876 B2 | 4/2014 | Vaddadi et al. |
| 8,719,351 B2 | 5/2014 | Chen et al. |
| 8,908,937 B2 | 12/2014 | Beck |
| 9,158,988 B2 | 10/2015 | Patel et al. |
| 9,230,339 B2 | 1/2016 | Wexler et al. |
| 9,311,554 B2 | 4/2016 | Boncyk et al. |
| 9,330,474 B1 | 5/2016 | Shekar et al. |
| 9,424,482 B2 | 8/2016 | Patel et al. |
| 9,483,704 B2 | 11/2016 | Schwartz |
| 9,536,167 B2 | 1/2017 | Schwartz |
| 9,697,429 B2 | 7/2017 | Patel et al. |
| 9,830,742 B2 | 11/2017 | Bhatawadekar et al. |
| 10,282,607 B2 | 5/2019 | Garcia et al. |
| 10,949,665 B2 | 3/2021 | Garcia et al. |
| 2004/0136569 A1 | 7/2004 | Daley et al. |
| 2011/0066687 A1 | 3/2011 | Chen et al. |
| 2011/0299770 A1 | 12/2011 | Vaddadi et al. |
| 2014/0163711 A1 | 6/2014 | Matsubara et al. |
| 2014/0369607 A1 | 12/2014 | Patel et al. |
| 2015/0117788 A1 | 4/2015 | Patel et al. |
| 2015/0235157 A1 | 8/2015 | Avegliano et al. |
| 2015/0276379 A1 | 10/2015 | Ni et al. |
| 2016/0171336 A1 | 6/2016 | Schwartz |
| 2016/0171429 A1 | 6/2016 | Schwartz |
| 2016/0171707 A1 | 6/2016 | Schwartz |
| 2016/0328618 A1 | 11/2016 | Patel et al. |
| 2016/0350906 A1 | 12/2016 | Meier et al. |
| 2016/0364628 A1 | 12/2016 | Kim et al. |
| 2018/0121721 A1 | 5/2018 | Garcia et al. |
| 2019/0258856 A1 | 8/2019 | García et al. |

OTHER PUBLICATIONS

International Searching Authority, "International Search Report and Written Opinion," issued in connection with International Patent Application No. PCT/IB2016/001664, dated Aug. 25, 2017, 10 pages.

United States Patent and Trademark Office, "Non-Final Office Action", issued in connection with U.S. Appl. No. 15/317,674 dated Jun. 28, 2018, 44 pages.

United States Patent and Trademark Office, "Notice of Allowance and Fee(s) Due", issued in connection with U.S. Appl. No. 15/317,674 dated Dec. 20, 2018, 19 pages.

United States Patent and Trademark Office, "Notice of Allowance and Fee(s) Due", issued in connection with U.S. Appl. No. 16/401,744 dated Oct. 30, 2020, 9 pages.

International Searching Authority, "International Preliminary Report on Patentability," issued in connection with International Patent Application No. PCT/IB2016/001664, dated Apr. 30, 2019, 6 pages.

REDUCING SCALE ESTIMATE ERRORS IN SHELF IMAGES

RELATED APPLICATIONS

This patent arises from a continuation of U.S. application Ser. No. 16/401,744 (now U.S. Pat. No. 10,949,665), titled "Reducing Scale Estimate Errors in Shelf Images," filed May 2, 2019, which is a continuation of U.S. application Ser. No. 15/317,674 (now U.S. Pat. No. 10,282,607), titled "Reducing Scale Estimate Errors in Shelf Images," filed Jun. 8, 2017, which is a § 371 national stage entry of PCT/IB2016/001664, titled "Reducing Scale Estimate Errors in Shelf Images," and filed Oct. 28, 2016. U.S. application Ser. No. 16/401,744; U.S. application Ser. No. 15/317,674; and PCT/IB2016/001664 are hereby incorporated by this reference in their entireties.

FIELD OF THE DISCLOSURE

This disclosure relates generally to image recognition in shelf images and, more particularly, to reducing scale estimate errors in shelf images.

BACKGROUND

Image recognition applications or programs may be used to identify consumer packaged goods. For example, when performing an in-store shelf audit, a market research firm may use an image recognition application to identify the products displayed on store shelves. Shelf auditing can be used to report the items (e.g., goods) displayed in a store, where these items are displayed, how many times the times are displayed, etc. Image recognition applications or programs analyze a shelf image and attempt to match objects (e.g., shelf items) in the shelf image with one or more reference images that are associated with particular products.

DETAILED DESCRIPTION

Example image recognition methods, apparatus/systems and articles of manufacture that may be implemented to perform product auditing of a shelf image are disclosed herein. Example image processing systems and methods disclosed herein achieve better recognition rates than known image recognition systems. As a result, an auditor may spend less time reviewing the results of an image recognition process and, thus, the example systems and methods increase the efficiency of a shelf image audit process. Further, example image processing systems and methods disclosed herein more accurately determine the dimensions of the products in a shelf image, which can be used to enhance the image recognition process and generate more accurate reports regarding shelf space.

In general, market research entities (MREs) and/or merchants (e.g., wholesalers, club stores, retailers, e-commerce retailers) offer services based on recognizing consumer packaged goods (e.g., products, items, objects, etc.) from images captured by image capturing devices (e.g., cameras, smartphones, tablets, video recorders, etc.). For example, an MRE may provide point-of-sale (e.g., shelf) auditing services to marketers, manufacturers, merchants and/or advertisers to help determine if, for example, display locations of products and/or display quality requirements (e.g., the goods are facing the correct orientation, the shelf is fully stocked, etc.) are satisfied. MRE and/or merchants typically use an image recognition application (e.g., program, software, algorithm, etc.) that analyzes a point-of-sale (POS) image and attempts to detect and identify the products in the point-of-sale image. As used herein, the terms point-of-sale image, shelf image and store image are used interchangeably and mean any image having one or more objects (e.g., a consumer product), such as objects of interest to be audited. A shelf image may contain only one shelf, a portion of a shelf, multiple shelves (e.g., in a column) and/or any other display orientation where a product is presented to a consumer.

Prior image recognition applications analyze a shelf image and attempt to match objects (e.g., items, products, etc.) in the shelf image with one or more patterns that represent a known product. As used herein, a pattern is an image representation of an object, such as a product, a portion of a product, a packaging of a product, a portion of a packaging of a product, etc. If a pattern is matched with an object in the shelf image, the object can be associated with that product and the information can be used for, in some examples, auditing purposes.

Some prior image recognition applications fail to detect all of the products in the image and/or incorrectly identify products. This is due, in part, to circumstances where scaling information associated with the patterns are not available or accurate. A scale of a pattern is a unique relationship between the dimensions of the pattern (in pixels (px)) and the dimensions (in millimeters (mm)) of the object represented by the pattern. For example, a scale of a pattern may be 2 px/mm. Thus, every two pixels in the pattern represents 1 mm of the real dimension of the object in the pattern. While the dimensions of the pattern (in pixels) are generally known, the dimensions of the object represented in the pattern are not always accurate. Thus, the scale of a pattern may be inaccurate. Further, the same is true with the scale of the shelf image. This inaccuracy in the true scale of the patterns and the shelf image causes problems during the image recognition process. In particular, once a shelf image scale estimate (in px/mm) is determined, the patterns are rescaled or resized based on a scaling ratio (e.g., a scaling factor) to match the shelf image scale estimate. In general, image recognition processes are more accurate when the scale of a pattern is the same as the scale of the shelf image, because the size of the pattern is presumably a 1:1 ratio of the size of the corresponding object in the shelf image.

If the size of the pattern is different than the size of the object in the shelf image, the image recognition process is less accurate, and may not detect the object as corresponding to the correct pattern. As mentioned above, the scales of the patterns and the scale of the shelf image are often inaccurate and, thus, this leads to ineffective image recognition processes. As such, to ensure high accuracy output, an auditor (e.g., a user, an operator, a technician, etc.) manually reviews the results of the image recognition process to verify that all of the products in the image have been detected and/or that all of the products are correctly identified. In some examples, identifying an object in a shelf image involves manually searching through a database containing thousands of products and then assigning an item number (SKU) and/or International Article Number (EAN) code to the area once a reference product is located. This process of manually reviewing thousands of products in a database and assigning SKU/EAN codes requires significant time, processing resources, and/or experience on behalf of the auditor.

Example image processing systems and methods disclosed herein increase the accuracy of the scale estimates of the patterns and the shelf image and facilitate better recognition rates. Example image processing systems and methods disclosed herein determine optimized scales for patterns, which can be used to increase the accuracy during the image recognition process. As used herein, an optimized scale is a scale based two or more scale estimates of a pattern. For example, some of the patterns may have multiple scale estimates (e.g., from previous matches in other shelf images). In some examples, the optimized scale is a median of the scale estimates for the corresponding pattern. Thus, the optimized scale is a more accurate value of the scale for the particular pattern. In some examples, the image processing system only calculates optimized scales for patterns having a threshold number of scale estimates. If the threshold is two, for example, then optimized scales are calculated for patterns having two or more scale estimates. If a pattern has only one scale estimate, for example, the scale estimate may be set to default or unknown, in which case the scale estimate for that pattern is not relied on during the image recognition process (as discussed in further detail herein).

In some examples, prior to performing an image recognition process with an image recognition application, the example image processing system rescales or resizes the patterns to the scale estimate of the shelf image (e.g., based on a scale ratio). The image recognition application then uses the rescaled/resized versions of the patterns in the image recognition process. The image recognition application attempts to match the patterns to one or more objects (e.g., products) in the shelf image. However, in some instances, the rescaled/resized versions of the patterns are still different sizes (in pixels) than the corresponding objects matched in the shelf image. In some examples, the example image processing system determines an example scale correction value for the shelf image. In some examples, the scale correction value is based on a statistical measurement of the deviation values between the sizes of the rescaled patterns having optimized scales and the corresponding objects matched in the shelf image. The example scale correction value represents an overall deviation between the size of the patterns and the matched objects in the shelf image. The example scale correction value can be used to adjust or modify the shelf image scale estimate and/or determine another scale estimate for each the matched patterns, which can be added to, combined with, and/or otherwise considered with the example scale estimates for the corresponding patterns and used in subsequent processes. After two or more iterations, the scale estimates for the patterns tend to converge to the true or accurate scales. Thus, with more accurate scale information for the shelf image and the patterns, further image recognition processes become more accurate.

Example apparatus to reduce scale estimate errors are disclosed herein. Example apparatus include an image recognition application to identify matches between stored patterns and objects detected in a shelf image, where the shelf image has a shelf image scale estimate. Some example apparatus further include a scale corrector to calculate deviation values between sizes of (A) a first set of the objects detected in the shelf image and (B) a first set of the stored patterns matched with the first set of the objects and reduce an error of the shelf image scale estimate by calculating a scale correction value for the shelf image scale estimate based on the deviation values.

In some examples, the scale corrector is to calculate the deviation values by determining a difference in pixel dimensions of a first scaled version of a first pattern of the first set of the stored patterns and a first object of the first set of the objects matched with the first pattern. In some such examples, the example apparatus further includes a rescaler to generate the first scaled version of the first pattern by rescaling the first pattern based on the shelf image scale estimate.

In some examples, the first set of the stored patterns have optimized scales. In some examples, the apparatus further includes a pattern scale optimizer to determine the optimized scales for the first set of the stored patterns. In some examples, the optimized scales are a median of estimated scales for the first set of the stored patterns. In some examples, the stored patterns include a second set of the stored patterns, where the first set of the stored patterns have a number of scale estimates that satisfy a threshold, and the second set of the stored patterns have a number of scale estimates that do not satisfy the threshold.

Example methods to reduce scale estimate errors are disclosed herein that include identifying, by executing an instruction with a processor, matches between stored patterns and objects detected in a shelf image, where the shelf image having an shelf image scale estimate. Example methods also include calculating, by executing an instruction with the processor, deviation values between sizes of (A) a first set of the objects detected in the shelf image and (B) a first set of the stored patterns matched with the first set of the objects, and reducing an error of the shelf image scale estimate by calculating, by executing an instruction with the processor, a scale correction value for the shelf image scale estimate based on the deviation values.

In some examples, calculating the deviation values includes determining a difference in pixel dimensions of a first scaled version of a first pattern of the first set of the stored patterns and a first object of the first set of the objects matched with the first pattern. Some example methods further include generating the first scaled version of the first pattern by rescaling the first pattern based on the shelf image scale estimate.

In some examples, the first set of the stored patterns have optimized scales. Some such example methods further include determining the optimized scales for the first set of the stored patterns. In some examples, the optimized scales are a median of estimated scales for the first set of the stored patterns. In some examples, the stored patterns include a second set of the stored patterns, where the first set of the stored patterns have a number of scale estimates that satisfy a threshold, and the second set of the stored patterns have a number of scale estimates that do not satisfy the threshold.

Tangible machine readable storage mediums are disclosed herein that include instructions that, when executed, cause a machine to at least identify matches between stored patterns and objects detected in a shelf image, where the shelf image having an shelf image scale estimate. The instructions further cause the machine to calculate deviation values between sizes of (A) a first set of the objects detected in the shelf image and (B) a first set of the stored patterns matched with the first set of the objects, and reduce an error of the shelf image scale estimate by calculating a scale correction value for the shelf image scale estimate based on the deviation values.

In some examples, the instructions, when executed, cause the machine to calculate the deviation values by determining a difference in pixel dimensions of a first scaled version of a first pattern of the first set of the stored patterns and a first object of the first set of objects matched with the first pattern. In some examples, the instructions, when executed, further cause the machine to generate the first scaled version of the first pattern by rescaling the first pattern based on the shelf image scale estimate.

In some examples, the first set of the stored patterns have optimized scales. In some examples, the instructions, when executed, further cause the machine to determine the optimized scales for the first set of the stored patterns. In some examples, the stored patterns include a second set of the stored patterns, where the first set of the stored patterns have a number of scale estimates that satisfy a threshold, and the second set of the stored patterns have a number of scale estimates that do not satisfy the threshold.

Figure 1:
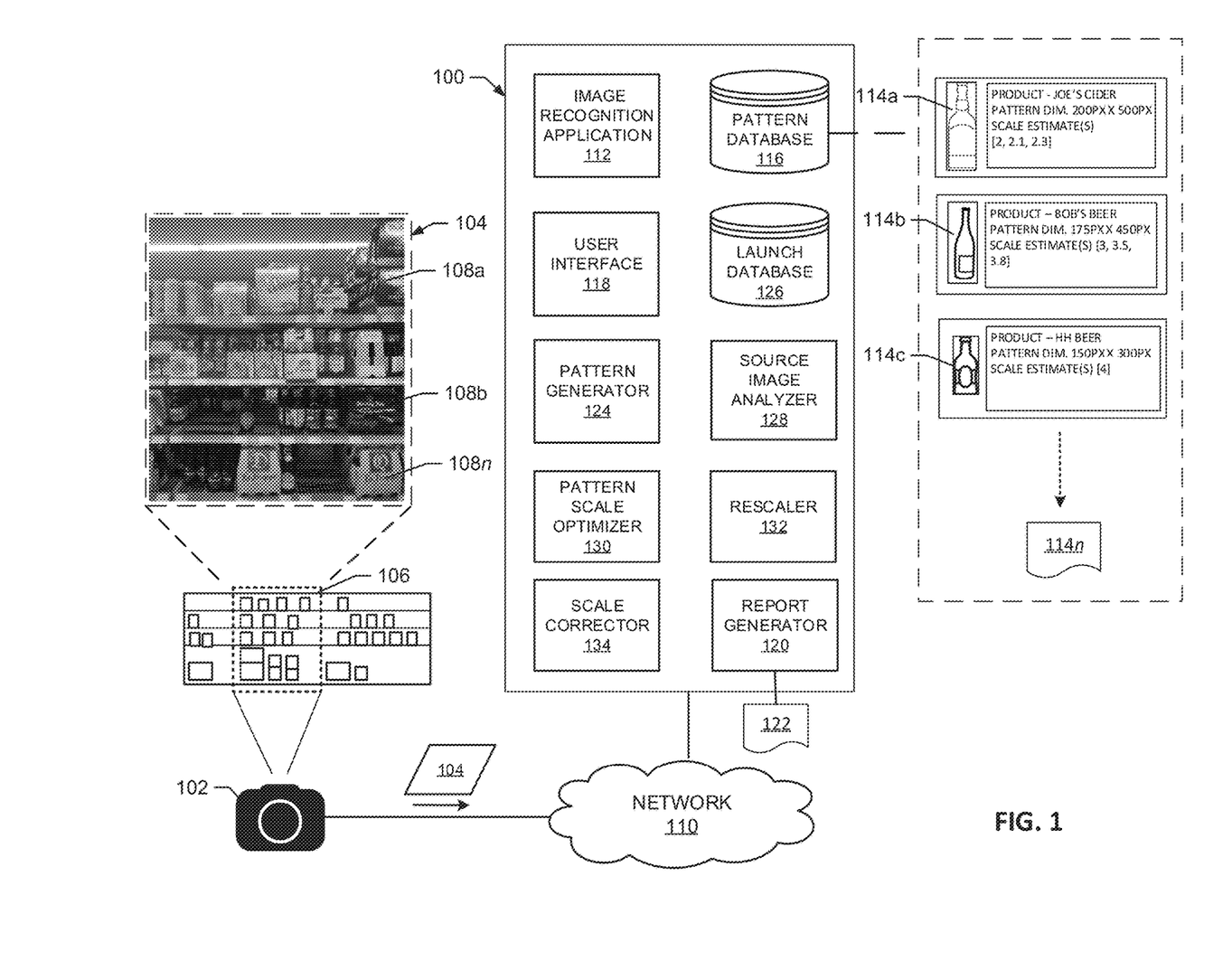
FIG. 1 illustrates an example image processing system capable of facilitating shelf auditing and constructed in accordance with the teachings of this disclosure.

Turning now to the figures, FIG. 1 illustrates an example image processing system 100 to perform image recognition in shelf images in accordance with the teachings of this disclosure. The example image processing system 100 may be implemented by an MRE. For example, the image processing system 100 may be used in a workflow of an auditor to perform product auditing in a shelf image. In the illustrated example of FIG. 1, an example image capturing device 102 (e.g., a camera, a video recorder, a smartphone, a tablet, etc.) captures an example shelf image 104 of an example shelf 106 having one or more products 108a-n (e.g., consumer packaged goods, items, objects, etc.). The example shelf 106 may be associated with a merchant (e.g., a retailer, a wholesaler, a club store, etc.). In other examples, the shelf 106 may be in another location, such as a consumer's home, in a vending machine, at a kiosk and/or any other establishment (e.g., a museum, a gallery, etc.) containing items on display and that can be audited. In the illustrated example of FIG. 1, the shelf image 104 is sent to the image processing system 100 through an example network 110 (e.g., the Internet, a local area network, a wide area network, a cellular data network, etc.) via a wired and/or wireless connection (e.g., a cable/DSL/satellite modem, a cell tower, etc.).

In the illustrated example, the image processing system 100 includes an example image recognition application 112 that analyzes the shelf image 104 to identify the product(s) 108a-n in the shelf image 104. The image recognition application 112 may be implemented by an application, software, engine, algorithm, hardware, etc. or any combination thereof. The image recognition application 112 attempts to recognize/identify and match the product(s) 108a-n in the shelf image 104 with one or more patterns 114a-n (e.g., reference product images) stored in a pattern database 116. As mentioned above, the example patterns 114a-n are images of known products or portions of a product, including a package, a label, etc. Example patterns 114-n are associated with a product and may include identifying information for the associated product. In some examples, the patterns 114a-n are provided by an external source (e.g., a manufacturer, a reference image collection team, the Internet, etc.). The example image recognition application 112 compares the example patterns 114a-n to objects in the shelf image 104 in an attempt to match the product(s) 108a-n in the shelf image 104 with the products associated with the patterns 114a-n. Example techniques that may be implemented by the image recognition application 112 include classification techniques (parametric and non-parametric), clustering techniques (deep learning models, k-means clustering), multilinear subspace learning techniques (principal component analysis), machine learning techniques, etc. Additionally or alternatively, example techniques that may be implemented by the image recognition application 112 include examples described in: U.S. patent application Ser. No. 14/530,129, entitled "Context-Based Image Recognition For Consumer Market Research," and filed Oct. 31, 2014, which corresponds to U.S. Patent Publication No. 2016/0125265, which published on May 5, 2016; U.S. Pat. No. 8,908,903, entitled "Image Recognition to Support Shelf Auditing for Consumer Research," and granted on Dec. 9, 2014; and U.S. Pat. No. 8,917,902, entitled "Image Overlaying and Comparison for Inventory Display Auditing," and granted on Dec. 23, 2014, all of which are incorporated herein by reference in their entireties.

In some examples, the results (e.g., matches) of the image recognition process are viewed on an example user interface 118. In some examples, the image recognition application 112 creates or generates a segmented image (e.g., such as the segmented image 200 of FIG. 2, discussed in further detail herein) indicating the results of the image recognition process. Matches between the example patterns 114a-n and the example products 108a-n may be stored as match records in the pattern database 116 and/or another database. Once the example image recognition application 112 generates the segmented image, the segmented image may be displayed on the user interface 118 for an auditor to review. The example user interface 18 may be implemented by any type of imaging display using any type of display technology, such as a liquid crystal display (LCD), a light emitting diode (LED) display, a plasma display, a cathode ray tube (CRT) display, etc., one or more input devices (e.g., a touchscreen, touchpad, keypad, mouse, keyboard, etc.) and/or one or more of the output devices 524 included in the example processor platform 500 described in connection with FIG. 5.

In some examples, the results are used by the example image processing system 100 to generate shelf-audit reports. For example, as illustrated in FIG. 1, the results (e.g., the match records) of the image recognition process are used by an example report generator 120 to generate an example report 122. In some examples, the report generator 120 estimates the share of a shelf (or portion of a shelf) occupied by a particular product or manufacturer of a product. The share of a shelf is a measure that represents the amount of space occupied in a shelf by a product or manufacturer. For example, based on the matches, the report generator 120 may determine that Brand A occupies 20% of the shelf, Branch B occupies 10% of the shelf, Branch C occupies 10% of the shelf, and Brand D occupies 60% of the shelf. The example report 122 can be used by the manufacturers of Brands A, B, C and/or D to ensure compliance with the contracts between the merchant and the manufacturers (e.g., based on an agreed quota for a particular shelf percentage).

However, as mentioned above, the example image recognition application 112 may be less effective when the scales of the patterns 114a-n are not accurate. In some instances, the image recognition application 112 may not detect an object in the shelf image 104 corresponding to one of the patterns 114a-n and/or may falsely identify an object in the shelf image 104 as corresponding to one of the patterns 114a-n (e.g., a false positive). As such, auditors may spend numerous hours reviewing the results of the image recognition process, attempt to manually identify the product(s) shown in the shelf image 104, and/or utilize computing resources to correct errors. Labeling the products may involve manually and/or computationally intensive searches searching through one or more databases containing thousands of products, and then assigning an item number, such as an SKU, and/or International Article Number (EAN) code to the product depicted in a region of interest once a reference product is located. This process of manually reviewing thousands of products in a database and assigning SKU/EAN codes may require substantial time, computational resources, and/or experience on behalf of the auditor.

In some examples, patterns are created manually by an auditor. For example, an auditor may review a shelf image on the user interface 118. The auditor may highlight and/or otherwise select a region of interest (ROI) that defines a stock keeping unit (SKU) or a portion of a unit (e.g., a label) to save as a pattern. In the illustrated example of FIG. 1, the image processing system 100 includes a pattern generator 124 that detects the highlighted ROI and saves an image associated therewith as a pattern. After a pattern is created, identification information (e.g., a brand name) and/or a scale estimate may be associated with the pattern. In some examples, an auditor assigns identification information to the pattern by manually selecting the information. In some examples, the pattern generator 124 determines an initial scale estimate (e.g., a default scale) for the new pattern. The scale estimate (e.g., in px/mm) is based on the pixel dimensions (width and height in pixels) of the pattern and the estimated dimensions of the object represented in the pattern (e.g., based on the estimate dimensions of the image from which the pattern was created). The dimensions of the object represented in the pattern are typically unknown. In particular, while the true dimensions of a product may be known, the object represented in the pattern does not always correspond to the exact boundaries of the product. As such, the dimensions of the object represent in the pattern are estimated. Therefore, an estimated scale may be assigned to the pattern. In some examples, the estimated scale is based on the true dimensions of the product (if known). In other examples, the estimated scale may be based on an estimated dimension of the object as determined from an estimated dimension from the original image from which the pattern was created. When the pattern is matched with objects in other images, more scale estimates can be assigned to the pattern to create a scale estimate array. The scale estimates tend to converge around the true scale of the pattern and can be used to more accurately determine the true dimension of the object represented by the pattern.

In some examples, the auditor creates patterns from a shelf image after the shelf image has been processed by the image recognition application 112. For example, after the image recognition process, one or more products in the shelf image may not have been matched because there was no corresponding pattern for the product in the pattern database 116. As such, the auditor can create a pattern for the corresponding product. An example method for creating a pattern is described in connection with FIG. 3.

FIG. 1 illustrates example patterns 114a-n stored in the pattern database 116. The patterns 114a-n includes an example first pattern 114a, which is an image of a bottle of Joe's Cider. The example first pattern 114a has a pixel dimension (width and height) of 200 px by 500 px. In the illustrated example of FIG. 1, the first pattern 114a includes an array of stored scale estimates, including 2 px/mm, 2.1 px/mm, and 2.3 px/mm. The example scale estimates are approximations on what scale the example first pattern 114a represents. In other examples, the array of stored scale estimates may include more or fewer scale estimates.

Also illustrated in FIG. 1 is an example second pattern 114b, which is a bottle of Bob's Beer. The example second pattern 114b has a pixel dimension (width and height) of 175 px by 450 px. The second pattern 114b includes an array of stored scale estimates, including 3 px/mm, 3.5 px/mm, and 3.8 px/mm. In other examples, the array of stored scale estimates may include more or fewer scale estimates. An example third pattern 114c is also illustrated in FIG. 1. The example third pattern 114c has a pixel dimension (width and height) of 150 px by 300 px. In the illustrated example of FIG. 1, the third pattern 114c has only one scale estimate, 4 px/mm, which may be the default scale estimate. Likewise, the other ones of the patterns 114a-n may include similar information, containing any number of scale estimates.

In some examples, when performing an image recognition process on a shelf image, a category or sub-group of the patterns 114a-n may be selected (e.g., launched). In some examples, selecting a category or sub-group of the patterns 114a-n, instead of all of the patterns 114a-n, reduces the processing time of the image recognition application 112 and increases the efficiency of the image recognition process. For example, if the shelf image 104 is from a liquor store, then patterns relating to baby diapers do not need to be launched because such products are not expected to be on the shelf 106 in the liquor store. The example patterns 114a-n can be categorized based on the type of product (e.g., clothing, food, outdoor accessories, etc.). In the illustrated example of FIG. 1, the image processing system 100 includes a launch database 126 where the patterns 114a-n to be analyzed are stored. In some examples, a user may select (e.g., via the user interface 118) a desired category or sub-group of the patterns 114a-n to be launched. In some examples, changes to the information relating to the patterns 114a-n in the launch database 126 are updated to the pattern database 116, and vice versa.

To increase the likelihood that the example patterns 114a-n are correctly matched to objects appearing in the example shelf image 104, the patterns 114a-n are rescaled or resized to the same scale estimate as the shelf image 104. An example source image analyzer 128 determines the pixel dimensions (width and height) of the shelf image 104 and estimates a shelf image scale estimate (e.g., an initial common scale) based on an estimated dimension o of the shelf 106 appearing in the shelf image 104. For example, the shelf image 104 may have a pixel dimension (width and height) of 2,250 px by 3,375 px, and an estimated dimension of 1,500 mm by 2,250 mm. The source image analyzer 128 determines the shelf image scale estimate to be 1.5 px/mm: (2,250 px/1,500 mm+3,375 px/2,250)/2=1.5 px/mm. In some examples, the estimated dimension of the shelf 106 represented by the shelf image 104 is input by an auditor (e.g., via the user interface 118). In other examples, the source image analyzer 128 may perform an estimation using different approaches, such as image type or current pattern selection. For example, using the image type technique, the example source image analyzer 128 uses heuristic models based on rules depending on the type of shelf being analyzed. For example, shelves for diapers may have a common dimension (e.g., based on an average) that can be used by default. In some examples, an auditor specifies the type of shelf being analyzed, and the example source image analyzer 128 calculates the estimated dimensions for the shelf. Using the current pattern selection technique, the dimensions of the shelf 106 can be estimated based on the category or sub-group of patterns that are being launched. For example, if patterns relating to beer cans are being analyzed, the example source image analyzer 128 determines how many beer cans may typically appear on a shelf (e.g., a maximum number of beer cans), and determines an estimated dimension of the shelf based on the number of beer cans.

In some examples, prior to commencing the image recognition process, an example pattern scale optimizer 130 determines optimized scales for each of the example patterns 114a-n (being launched) that have a threshold number of scale estimates. For example, assume the threshold is two scale estimates. Thus, for any of the example patterns 114a-n having two or more scale estimates, the example pattern scale optimizer 130 determines an optimized scale for the corresponding pattern. In other examples, a different threshold value may be implemented. In some examples, the optimized scale is a median of the scale estimates for the corresponding pattern. For example, the first pattern 114a has three scale estimates. The pattern scale optimizer 130 determines a median of the array of scales estimates, which is 2.1 px/mm. Thus, 2.1 px/mm is determined to be an optimized scale corresponding to the first pattern 114a. For the example second pattern 114b, the example pattern scale optimizer 130 similarly determines the median of the array of scale estimates, which is 3.5 px/mm. Thus, 3.5 px/mm is determined to be an optimized scale corresponding to the example second pattern 114b. In some examples, for patterns that do not satisfy the threshold, the scale of the corresponding pattern is set to unknown (such that the pattern is not used in determining a scale correction value, discussed in further detail here). For example, with regards to the example third pattern 114c, there is only one scale estimate. Thus, the example third pattern 114c does not satisfy the threshold (e.g., having two or more scale estimates) so the example pattern scale optimizer 130 sets the optimized scale for the example third pattern 114c to default (e.g., unknown) (to distinguish the third pattern 114c from the other patterns 114a-n that meet the threshold and have optimized scales). The example pattern scale optimizer 130 continues to determine optimized scales for all of the patterns 114a-n that meet the threshold. The optimized scales may be stored with the corresponding patterns 114a-n in the example launch database 126. In other examples, instead of using a median of the scale estimates for the optimized scale, the pattern scale optimizer 130 may use another metric, such as an average, a cluster by applying statistical distances to minimize intra-cluster values (e.g., using Mahalanobis or Bhattacharyya distances) or another statistical model. In some examples, after the pattern scale optimizer 130 has analyzed the patterns 114a-n, there is a first set of patterns (those with optimized scale values (e.g., the first pattern 114a)) and a second set of patterns (those with unknown (default) scales (e.g., the third pattern 114c)).

After the example shelf image scale estimate is determined and the optimized scales for the example patterns 114a-n are determined, the example image processing system 100 resizes or rescales the example patterns 114a-n to the shelf image scale estimate, e.g., 1.5 px/mm. In the illustrated example of FIG. 1, the image processing system 100 includes a rescaler 132 to resize/rescale the patterns 114a-n. The example rescaler 132 rescales/resizes both the patterns having optimized scales (e.g., the first set of patterns (e.g., the first pattern 114a, the second pattern 114b, etc.)) and those patterns that have only one scale estimate (e.g., the second set of patterns that have scales identified as default (e.g., the third pattern 114c)). As a result, the example patterns 114a-n are increased or decreased in size (pixel dimension). For example, if the optimized scale for the first pattern 114a is 2.1 px/mm (as determined by the pattern scale optimizer 130 above), and the shelf image scale estimate is 1.5 px/mm (as determined by the source image analyzer 128 above), the example rescaler 132 transforms the first pattern 114a based a scaling ratio or factor of 0.71 (71%): 1.5 px/mm/2.1 px/mm=0.71. If the pixel dimension (width and height) of the first pattern 114a is 200 px by 500 px, then the pixel dimension (width and height) of the resized version of the first pattern 114a is about 142 px (200 px×0.71) by about 355 px (500 px×0.71). In some examples, the example rescaler 132 resizes/rescales the first pattern 114a using bicubic interpolation to determine the new size of the new first pattern. In some examples, this technique ensures smooth results where the pixels are created (e.g., during an upscale) from the neighboring pixels or mixed (e.g., during a downscale) into fewer pixels. In other examples, other techniques may be used. Each of the other ones of the patterns 114a-n are similarly resized/rescaled (e.g., based on a scaling ratio to increase or decrease the pixel dimensions) to match the shelf image scale estimate (e.g., 1.5 px/mm). In some examples, the scaled versions of the patterns 114a-n are stored in the launch database 126.

Figure 2:
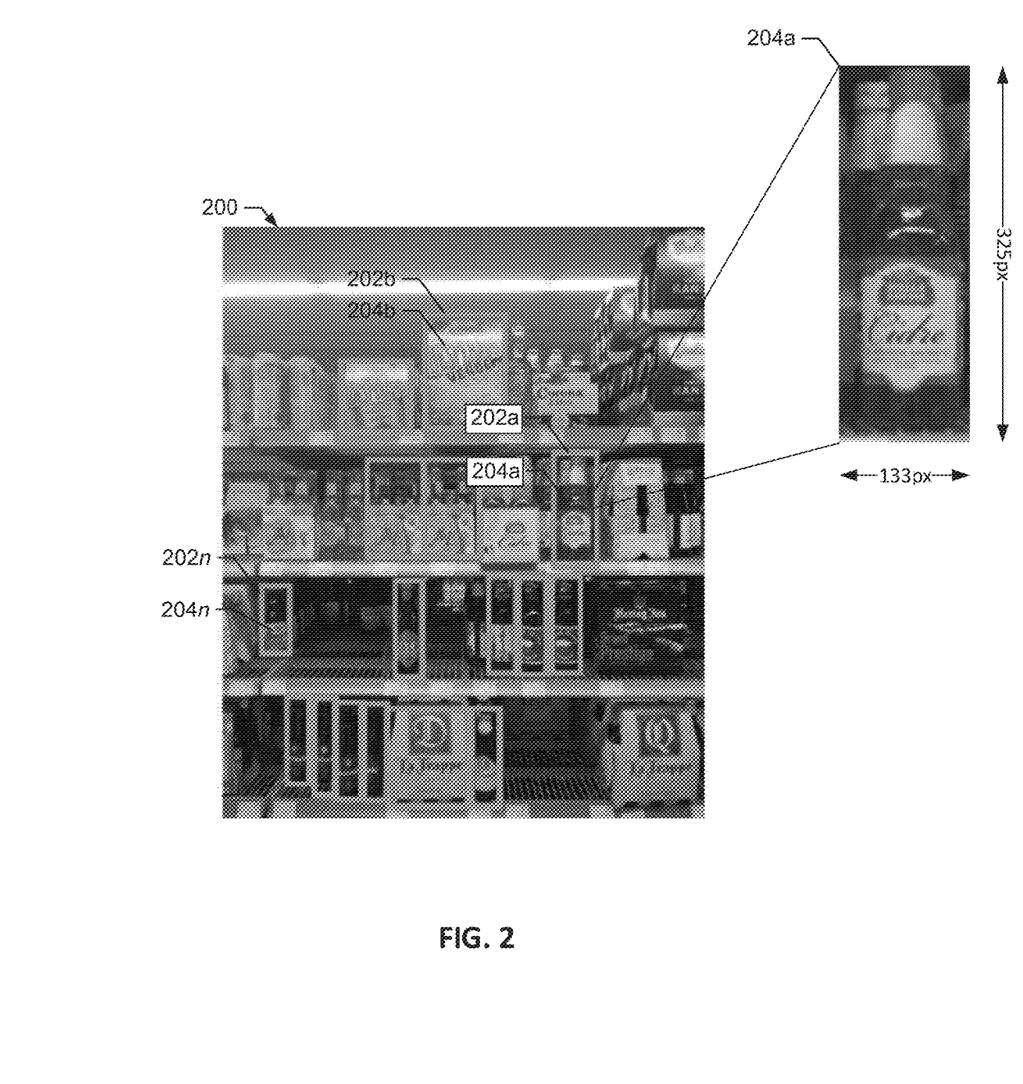
FIG. 2 illustrates an example segmented image generated by an example image recognition application of the example image processing system of FIG. 1.

The example image recognition application 112 then analyzes the example shelf image 104 and detects or identifies objects in the shelf image 104 that match the rescaled/resized versions of the patterns 114a-n. FIG. 2 illustrates an example segmented image 200 corresponding to the shelf image 104 produced by the image recognition application 112. The example segmented image 200 may also be referred to as a segmentation. The example segmented image 200 includes one or more frames 202a-n (e.g., a boundary, a rectangle, a grid, etc.) overlaid on top of the shelf image 104. The example frames 202a-n indicate the locations (e.g., positions, boundaries, regions, etc.) of objects 204a-n (e.g., the products 108a-n) in the example shelf image 104 that have been matched with one of the patterns 114a-n. In some examples, product information (e.g., a name of the respective product) may be displayed or presented along a top of the example frames 202a-n. In some examples, the identifying information included in respective ones of the example frames 202a-n is associated with the reference product(s) determined to match the corresponding products 108a-n depicted in the frames 202a-n and may be stored in a database (e.g., the launch database 126) and/or included in a report (e.g., the report 122). In some examples, the match records include the example shelf image 104, metadata associated with the captured image (if present), and/or a product identifier as returned from the reference record associated with the matching reference image (e.g., an MRE assigned product number, a UPC, etc.). The example match records are associated with particular ones of the example frames 202a-n. In some examples, the information included in the match record(s) is used by an example report generator 120 to generate an example match report 122. In some examples, the match record(s) are stored in a match database and/or included in the match report 122 and/or are used by the example image processing system 100 to generate shelf-audit reports.

In some examples, one or more of the objects 204a-n matched with the patterns 114a-n may have a different size (e.g., pixel dimension in width and height) than the rescaled versions of the patterns 114a-n. For example, as illustrated in FIG. 2, the first object 204a was identified as match with the first pattern 114a. However, the pixel dimensions of the example first object 204a may not be the same pixel dimensions of the resized version of the first pattern 114a. For example, assume the first object 204a in FIG. 2 has a pixel dimension (width and height) of about 133 px×325 px. However, as mentioned above, the pixel dimensions of the rescaled version of the first pattern 114a are about 142 px by 355 px. This deviation indicates an error in scale estimate of the shelf image 104 (e.g., 1.5 px/mm) and/or the estimate scale (e.g., the optimized scale of 2.1 px/mm) of the first pattern 114a.

Referring back to FIG. 1, to improve the accuracy of the scale estimates of the patterns 114a-n and the accuracy of the image recognition process, the image processing system 100 includes an example scale corrector 134. The example scale corrector 134 analyzes the deviation values in size between the matched patterns 114a-n (or the rescaled versions of the patterns 114a-n) with optimized scales and the corresponding objects in the shelf image 104, and calculates a scale correction value. In some examples, the scale corrector 134 performs a statistical analysis of all of the differences between the matched patterns and the corresponding objects in the shelf image 104. In some examples, the scale corrector 134 uses the three-sigma rule of thumb (sometimes referred to as the 68-95-99.7 rule), which is a statistical measure of the percentage of values that reside within a band around a mean in a normal distribution with a width of one, two and three standard deviations of the mean, which indicates a level of confidence in the obtained distribution. For example, assume the rescaled version of the first pattern 114a matched with the first object 204a, which is 0.06 (6%) larger than the rescaled version of the first pattern 114a, the rescaled version of the second pattern 114b matched with another object, which is 0.03 (3%) smaller that the rescaled version of the second pattern 114b, etc. The example scale corrector 134 identifies the differences in all of the scaled versions of the patterns 114a-n from the matched objects and finds a common correction. For example, the deviation value may result in an array such as [−0.06, −0.052, −0.02, −0.011, −0.008, +0.02, +0.02 . . . etc.]. For example, using the three-sigma rule of thumb, assume the scale corrector 134 determines that the mean around which the scale changes are centered +0.01 (+1.0%). This scale correction value indicates that the shelf image scale estimate is off by +1.0%. Therefore, the example scale corrector 134 may adjust the shelf image scale estimate based on the scale correction value. For example, if the original shelf image scale estimate was 1.5 px/mm (as described in an example above), the adjusted or optimized shelf image scale estimate is decreased by 0.01 (1.0%) to 1.485 px/mm. In other examples, the scale corrector 134 may determine that all of the deviation values are centered around zero and, thus, no correction is needed for the scale estimates. In some examples, significant outliers (e.g., outliers greater than 4-sigma) are ignored in the scale correction calculation.

Additionally, the example scale corrector 134 calculates a new scale estimate for each of the example matched patterns 114a-n having optimized scales (e.g., the first set of patterns) using the scale correction value. For instance, if the first object 204a in FIG. 2 is 133 px×325 px, and the adjusted shelf image scale estimate is 1.485 px/mm, then the dimension of the item represented by the first object 204a is estimated to be about 90 mm wide (133 px/1.485 px/mm) by 220 mm high (325 px/1.485 px/mm). If the first pattern 114a is 200 px by 500 px, then the example scale corrector 134 determines a scale estimate for the first pattern 114a is about 2.2 px/mm: (200 px/90 mm+500 px/220 mm)/2=~2.2 px/mm. This new scale estimate for the first pattern 114a is then added to the array of scale estimates, such that the array of scale estimates is now [2, 2.1, 2.2, 2.3]. Then, next time an image recognition process is performed, the optimized scale for the first pattern 114a may be 2.15 px/mm, which is the median of the array. As can be realized with this example approach, as more scale estimates are added to the array, the optimized scales converge toward the true scale and, thus, the true dimensions of the object represented in the corresponding pattern.

Likewise, the example scale corrector 134 may calculate a new scale estimate for each of the matched patterns 114a-n that do not have optimized scales (e.g., the second set of patterns (e.g., the third pattern 103c)). In this example, the new scale estimates are based on matches between the patterns 114a-n that had optimized scales (e.g., more than two scale estimates), which increases the accuracy of the deviation information and thus, increases the accuracy of the scale correction value. For example, assume the rescaled version of the third pattern 114c is matched with a third object 204c in the shelf image 104 having a pixel dimension (width and height) of 60 px by 112 px. Using the adjusted shelf image scale estimate of 1.485 px/mm, the estimated dimensions of the third object 204c are about 40 mm wide (60 px/1.485 px/mm) by 75 mm high (112 px/1.485 px/mm). Therefore, if the pixel dimensions of the third pattern 114c are 150 px by 300 px (FIG. 1), a new scale estimate is about 3.875 px/mm: (150 px/40 mm+300 px/75 mm)/2=~3.875 px/mm. This new scale estimate can then be added to the scale estimate array for the third pattern 114c. If the example third pattern 114c is used again in another recognition, the third pattern 114c may meet the threshold value (e.g., two) and an optimized scale may be calculated for the third pattern 114c (because the third pattern 114c meets the threshold value). As such, the optimized scale for the third pattern 114c may be used in calculating the overall scale correction value as described above. Thus, the scale correction value is based on scale estimates of those patterns having a certain number of previously stored scaled estimates, which increases the reliability of the image recognition process. In some examples, after the image recognition process is performed a first time, the image recognition process may be performed one or more subsequent times using the updated scale information. For example, the image recognition produces may be performed with the adjusted shelf image scale estimate (1.485 px/mm) and the new scale estimates for the patterns 114a-n.

As a pattern is used in more recognitions, the estimated scales for the pattern tend to converge toward the true scale of the pattern, thereby creating a more accurate scale estimate for the pattern. As a result, when the pattern is used for an image recognition process, the pattern can be rescaled/resized more accurately, which enables the image recognition process to be more accurate. In particular, the image recognition process is more accurate when a pattern can be rescaled/resized to the same scale as the source image. Further, the example image processing system 100 increases the accuracy of the estimation of the dimensions of the objects represented by the patterns and, thus, those matching objects in a shelf image. As a result, the example image processing system 100 can better estimate the share of a shelf that a particular product or brand of product occupies. This information is important in determining compliance with particular quotas as outlined in contracts between the store and the manufacturers. For example, a manufacturer and a store may have a contract requires the store to use 30% of a shelf for manufacturer's products. While the example image recognition process is described in connection with a shelf image for shelf auditing, the example techniques disclosed herein can likewise be applied to any other type of image recognition process where one or more patterns (e.g., reference images) are to be compared to a source image to identify matches.

While an example manner of implementing the image processing system 100 is illustrated in FIG. 1, one or more of the elements, processes and/or devices illustrated in FIG. 1 may be combined, divided, re-arranged, omitted, eliminated and/or implemented in any other way. Further, the example image recognition application 112, the example pattern database 116, the example report generator 120, the example pattern generator 124, the example launch database 126, the example source image analyzer 128, the example pattern scale optimizer 130, the example rescaler 132, the example scale corrector 134 and/or, more generally, the example image processing system 100 of FIG. 1 may be implemented by hardware, software, firmware and/or any combination of hardware, software and/or firmware. Thus, for example, any of the example image recognition application 112, the example pattern database 116, the example report generator 120, the example pattern generator 124, the example launch database 126, the example source image analyzer 128, the example pattern scale optimizer 130, the example rescaler 132, the example scale corrector 134 and/or, more generally, the example image processing system 100 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example image recognition application 112, the example pattern database 116, the example report generator 120, the example pattern generator 124, the example launch database 126, the example source image analyzer 128, the example pattern scale optimizer 130, the example rescaler 132, and/or the example scale corrector 134 is/are hereby expressly defined to include a tangible computer readable storage device or storage disk such as a memory, a digital versatile disk (DVD), a compact disk (CD), a Blu-ray disk, etc. storing the software and/or firmware. Further still, the example image processing system 100 of FIG. 1 may include one or more elements, processes and/or devices in addition to, or instead of, those illustrated in FIG. 1, and/or may include more than one of any or all of the illustrated elements, processes and devices.

Figure 3:
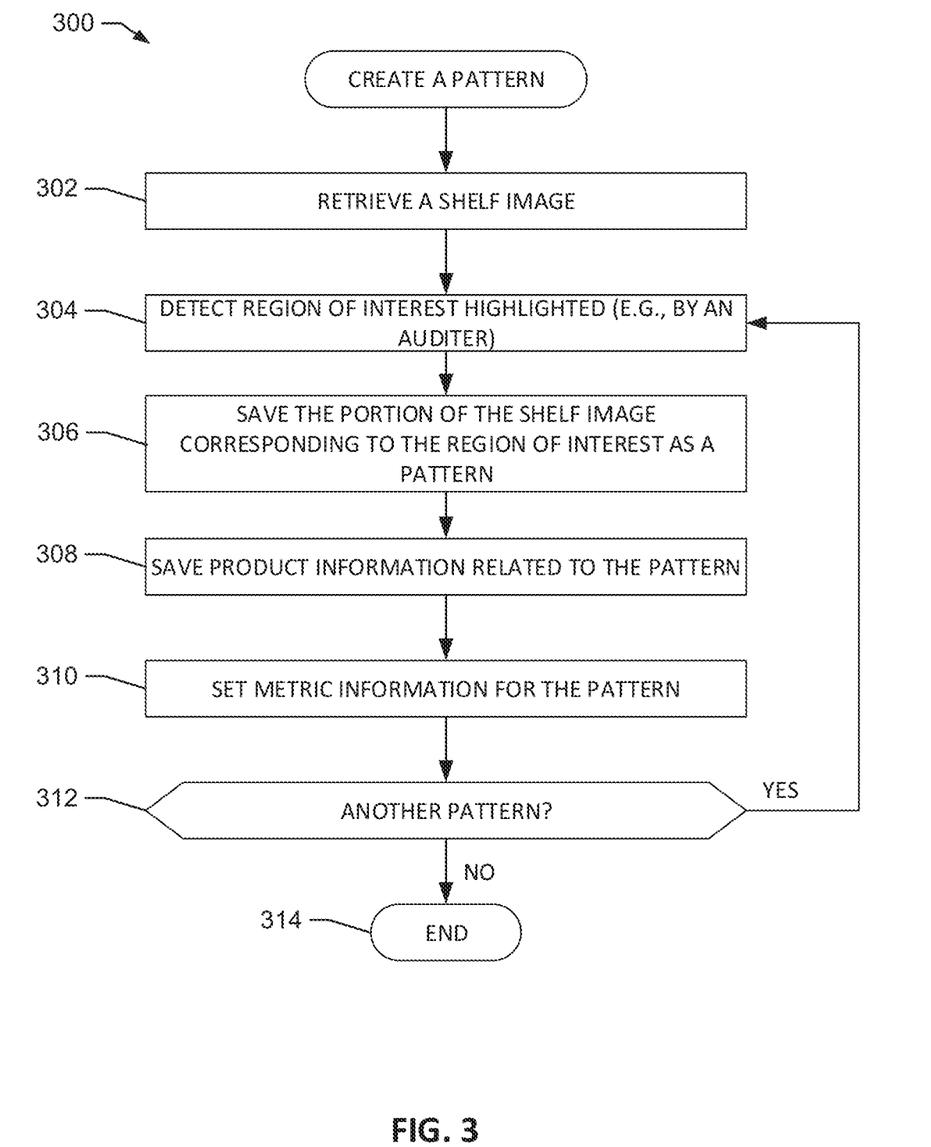
FIG. 3 is a flowchart representative of an example method, at least partially executable by machine readable instructions, which may be implemented by the example image processing system of FIG. 1 to create an example pattern.
Figure 4A:
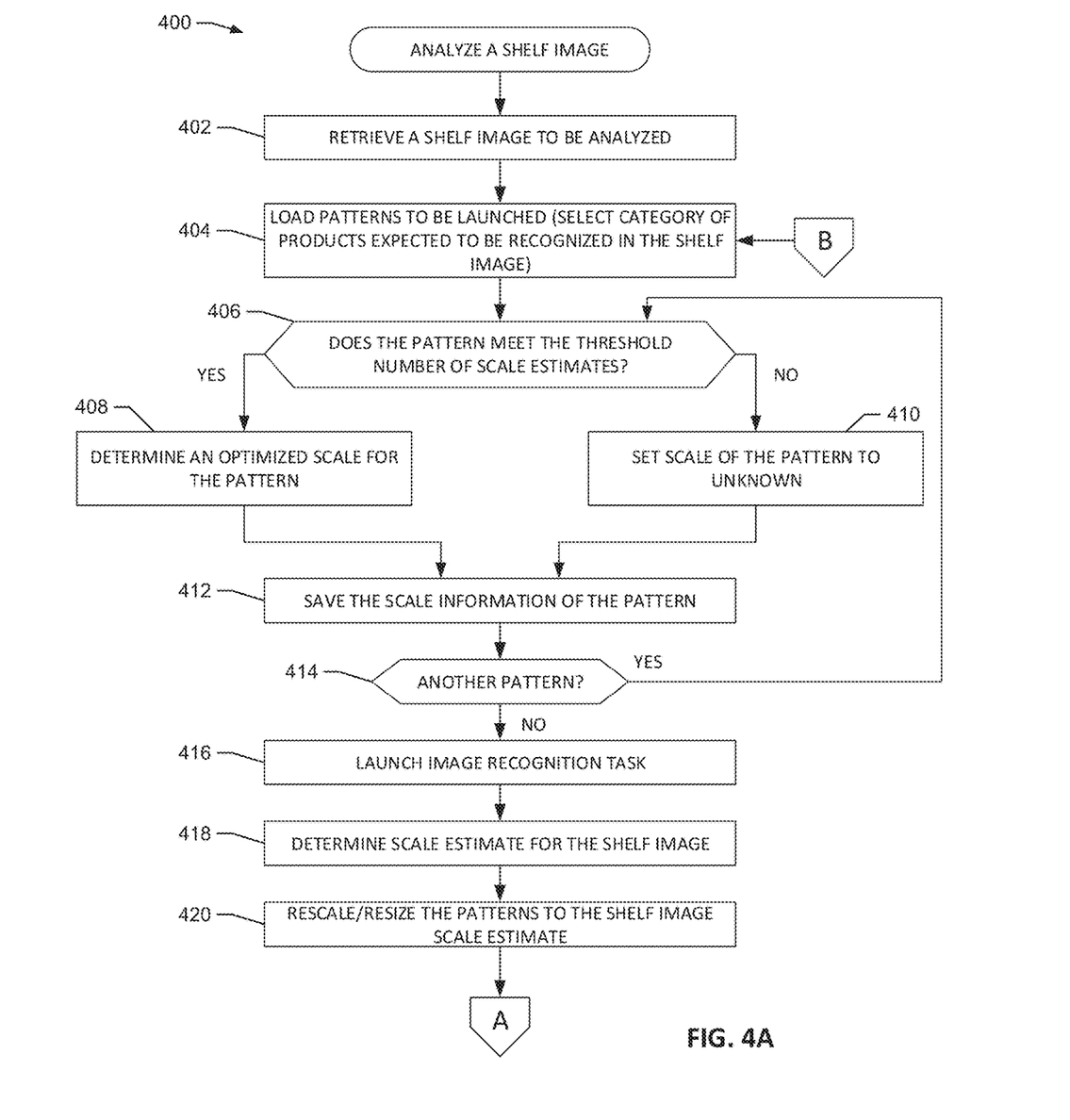
FIGS. 4A and 4B are flowcharts representative of an example method, at least partially executable by machine readable instructions, which may be implemented by the example image processing system of FIG. 1 to analyze a shelf image.
Figure 4B:
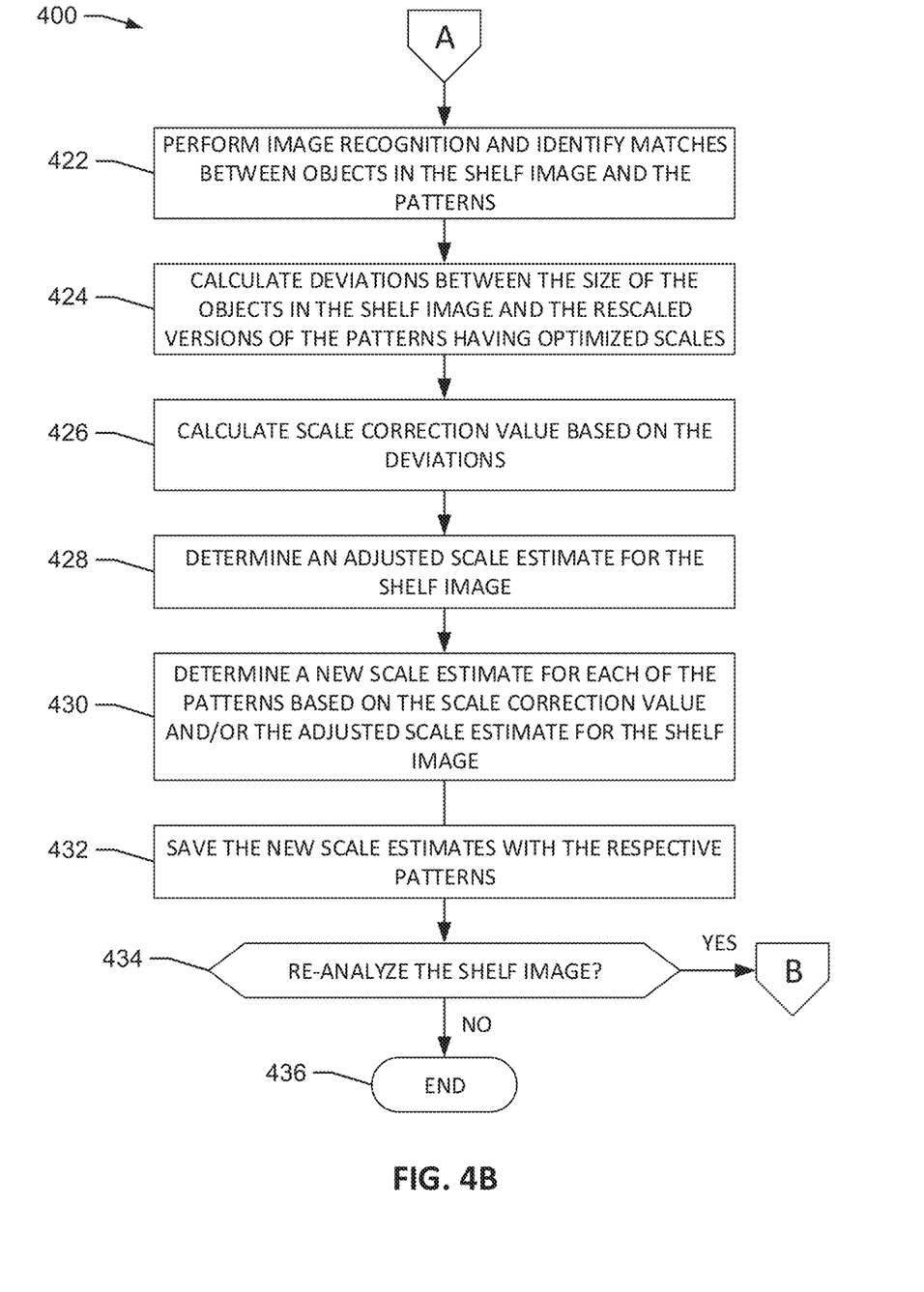

Flowcharts representative of example machine readable instructions for implementing the image recognition application 112, the example pattern database 116, the example report generator 120, the example pattern generator 124, the example launch database 126, the example source image analyzer 128, the example pattern scale optimizer 130, the example rescaler 132, the example scale corrector 134 and/or, more generally, the example image processing system 100 are shown in FIGS. 3, 4A and 4B. In these examples, the machine readable instructions comprise a program for execution by a processor such as the processor 512 shown in the example processor platform 500 discussed below in connection with FIG. 5. The programs may be embodied in software stored on a tangible computer readable storage medium such as a CD-ROM, a floppy disk, a hard drive, a digital versatile disk (DVD), a Blu-ray disk, or a memory associated with the processor 512, but the entire programs and/or parts thereof could alternatively be executed by a device other than the processor 512 and/or embodied in firmware or dedicated hardware. Further, although the example programs are described with reference to the flowcharts illustrated in FIGS. 3, 4A and 4B, many other methods of implementing the example image recognition application 112, the example pattern database 116, the example report generator 120, the example pattern generator 124, the example launch database 126, the example source image analyzer 128, the example pattern scale optimizer 130, the example rescaler 132, the example scale corrector 134 and/or, more generally, the example image processing system 100 may alternatively be used. For example, the order of execution of the blocks may be changed, and/or some of the blocks described may be changed, eliminated, or combined.

As mentioned above, the example processes of FIGS. 3, 4A and 4B may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 3, 4A and 4B may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 3 is a flowchart representative of an example method 300 for creating patterns and which may be implemented the example image processing system 100 of FIG. 1. In some examples, the example method 300 corresponds to a workflow for creating new patterns that may be performed by an auditor. At block 302, the example image processing system 100 retrieves a new shelf image such as, for example, the shelf image 104. In some examples, the shelf image 104 is provided by the image capturing device 102. An auditor may view the example shelf image 104 on the user interface 118. In some examples, the shelf image 104 is an image that has been previously analyzed by the image recognition application 112. For example, as mentioned above, in some instances the image recognition application 112 does not recognize all of the products 108a-n in the shelf image 104. When reviewing the segmented image 200, an auditor may see that one of the products in the segmented image 200 has not been recognized. The auditor may highlight or otherwise select a region of interest (ROI) (e.g., an object) in the image corresponding to a product or portion of a product (e.g., a label) for which the auditor wants to create a pattern.

At block 304, the example pattern generator 124 detects a ROI identified (e.g., selected, highlighted, etc.) by the auditor. At block 306, the example image processing system 100 saves the portion of the image corresponding to the ROI as a pattern in the example pattern database 116. The auditor may identify a product, branch, etc. associated with the pattern. In some examples, the auditor selects the information form a menu or list of options. At block 308, the example image processing system 100 saves product information (e.g., name of the product, type of packaging, number of products in each package, etc.) related to the newly created pattern. In some examples, an auditor manually enters the product information At block 310, the example pattern generator 124 determines (e.g., sets) metric information for the pattern. For example, the pattern generator may calculate a scale estimate for the pattern based on the pixel dimensions (width and height) of the pattern and the estimated dimensions of the object represented in the pattern. In some examples, the estimated dimensions of the object are based on estimated dimensions of the source image (e.g., the shelf image 104 from which the pattern was created). In other examples, the true dimensions of the product may be known and used to calculate the initial scale estimate. However, as described above, using the true dimensions of the product may not result in an accurate scale as the boundaries of the pattern are not always accurate. At block 312, the example image processing system 100 determines whether another pattern is to be created. If so, the example method 300 can be repeated. Otherwise, the example method 300 ends at block 314.

FIGS. 4A and 4B are flowcharts representative of example methods 400 for analyzing a shelf image (e.g., performing a shelf audit) and which may be implemented by the example image processing system 100 of FIG. 1. At block 402 in FIG. 4A, the example image processing system 100 retrieves the shelf image 104 (e.g., from the image capturing device 102). The shelf image 104 is to be analyzed by an image recognition application to identify products and other associated information in the shelf image 104 as part of an audit. At block 404, the example image processing system 100 loads the patterns to be launched. For example, as mentioned above, the patterns 114a-n in the pattern database 116 may include patterns not relevant to a particular audit. Therefore, a category or sub-group of the patterns 114a-n to be analyzed may be stored in launch database 126.

At block 406 of the example method 400, the pattern scale optimizer 130 determines whether a pattern being launched satisfies (e.g., meets, exceeds, etc.) a threshold number of scale estimates. In some examples, the threshold is two scale estimates. Thus, for example, the first pattern 114a, which has three scale estimates, satisfies the threshold. In other examples, other thresholds may be used (e.g., 5, 8, etc.). If a pattern satisfies the threshold, the example pattern scale optimizer 130 determines an optimized scale for the corresponding pattern at block 408. In some examples, the optimized scale is a median of the scale estimate array for the corresponding pattern. For example, the median of the scale estimate array of the first pattern 114a is 2.1 px/mm. In other examples, another metric (e.g., an average) may be used to calculate an optimized scale. If a pattern does not satisfy the threshold (e.g., the pattern only has one scale estimate), the example pattern scale optimizer 130 sets the scale of the pattern to unknown (e.g., default) at block 410. At block 412, the example pattern scale optimizer 130 saves the scale information (the optimized scale or the default scale) of the pattern (e.g., in the launch database 126). At block 414, the example pattern scale optimizer 130 determines if there is another pattern to be analyzed. If so, the example method 400 proceeds to block 406 for the next pattern. If all of the patterns to be launched have been analyzed, the example method 400 proceeds to block 416. In some examples, after the pattern scale optimizer 130 has analyzed the patterns, there is a first set of patterns (those with optimized scales) and a second set of patterns (those with unknown (default) scales).

At block 416, the example image processing system 100 launches the image recognition task, e.g., by activating the example image recognition application 112. At block 418, the example source image analyzer 128 determines the shelf image scale estimate for the example shelf image 104 based on the pixel dimensions (width and height) of the shelf image 104 and an estimated dimension of the shelf 106 represented in the shelf image 104. For example, as mentioned above in connection with FIG. 1, the shelf image 104 may have a scale estimate of 1.5 px/mm.

At block 420, the example rescaler 132 rescales or resizes the example patterns 114a-n to the same scale as the shelf image scale estimate. For example, if the optimized scale for the first pattern 114a is 2.1 px/mm (as determined by the pattern scale optimizer 130 at block 408), and the shelf image scale estimate is 1.5 px/mm (as determined by the source image analyzer 128 at block 418), the rescaler 132 transforms the first pattern 114a based on a scaling ratio or factor of 0.71 (71%). The example rescaler 132 rescales or resizes all of the patterns with optimized scales (based on the corresponding optimized scales) and the patterns without optimized scales (based on the single scale estimate for the corresponding pattern). After block 420, the example method 400 continues to FIG. 4B.

At block 422 in FIG. 4B, the example image recognition application 112 analyzes the example shelf image 104 and identifies the objects 204a-n in the shelf image 104 that match the example patterns 114a-n (e.g., the resized/rescaled versions of the patterns 114a-n). In some examples, the image recognition application 112 creates a segmented image, such as the segmented image 200 of FIG. 2, which displays frames 202a-n around the objects 204a-n matched with the patterns 114a-n.

As mentioned above, in some examples, the objects 204a-n in the shelf image 104 that are matched to the patterns 114a-n are a different size (in pixels) than the rescaled/resized versions of the patterns 114a-n. At block 424, the scale corrector 134 calculates the deviation values (e.g., the differences) between the sizes of the objects 204a-n in the shelf image 104 (e.g., a first set of the objects 204a-n) and the rescaled/resized versions of the patterns 114a-n for those patterns having an optimized scaled (e.g., those patterns with two or more previous scale estimates, a first set of the patterns 114a-n)). In other words, for each scaled version of a pattern having an optimized scale and that has been matched to an object in the shelf image 104, the example scale corrector 134 determines a difference in size (if any) between the scaled version of the pattern and the matched object in the shelf image 104. Therefore, in some examples, the scale corrector 134 does not calculate the difference in size between the objects in the shelf image 104 that matched the rescaled versions of the patterns without optimized values (e.g., those patterns that did not satisfy the threshold at block 406). As such, only those patterns having optimized scales, which are more reliable, are used to determine the scale correction value.

At block 426, the example scale corrector 134 calculates a scale correction value for the shelf image scale estimate based on the deviation values (as determined at block 424). In some examples, the scale correction value is based on a three-sigma rule. If the deviation values fall around zero, for example, then no correction may be needed. However, if the deviation values fall around a particular (e.g., threshold) positive or negative value, then a scale correction value is determined. For instance, if the average deviation value is +0.01 (+1%), then the scale correction value is −0.01 (−1%).

At block 428, the example scale corrector 134 determines an adjusted or corrected scale estimate for the example shelf image 104 based on the scale correction value (as determined at block 426). For example, if the original scale estimate of the shelf image 104 was 1.5 px/mm, the scale corrector 134 decreases the original estimate by the scale correction value 0.01 (−1%) to result an adjusted scale estimate of 1.485 px/mm.

At block 430, the example scale corrector 134 determines a new scale estimate for each of the example patterns 114*a-n* matched in the example shelf image 104 based on the size of the corresponding object and using the scale correction value and/or the adjusted scale estimate of the shelf image 104. For example, as illustrated in FIG. 2, the first pattern 114*a* was matched with the first object 204*a* in the shelf image 104. The example scale corrector 134 can determine an estimated dimension of the example first object 204*a* based on the pixel dimension of the first object 204*a* and the adjust shelf image scale estimate. The estimated dimensions can then be used to calculate a new scale estimate for the first pattern 114*a* based on the pixel dimensions (e.g., 200 px by 500 px) of the first pattern 114*a*.

At block 432, the example image processing system 100 saves the new scale estimates (as determined at block 430) for the respective patterns 114*a-n* in the pattern database 116. As can be realized, as more recognitions occur and more scale estimates are added to the scale estimate arrays, the average of the arrays converge toward a true dimension of the respective pattern. Thus, when the pattern is used again in another recognition, the optimized scale value is closer to the actual value and, thus, can be more accurately resized/rescaled to the dimensions of the image. This enhances the ability of the image recognition application 112 to match objects in the shelf image 104 and reduces errors (e.g., reduces false positives) when identifying such objects.

At block 434, the example image processing system 100 determines whether to reanalyze the example shelf image 104. If so, the method 400 continues to block 404 in FIG. 4A. During the second analysis, some of the example patterns 114*a-n* that previously did not satisfy the threshold at block 406 (e.g., the third pattern 114*c*), may now meet the threshold. Those patterns can then be more correctly resized/rescaled (e.g., at block 420). As a result, there is a greater chance that objects in the shelf image 104 are matched with the corresponding pattern. The example method 400 can be repeated numerous times. Each iteration refines the results and leads to a more accurate image recognition process. In some examples, after the image recognition process is complete and the values are updated, the example report generator 120 generates the example report 122 and/or the results are displayed on the user interface 118. Otherwise, if the shelf image 104 is not re-analyzed, the method 400 ends at block 436.

Figure 5:
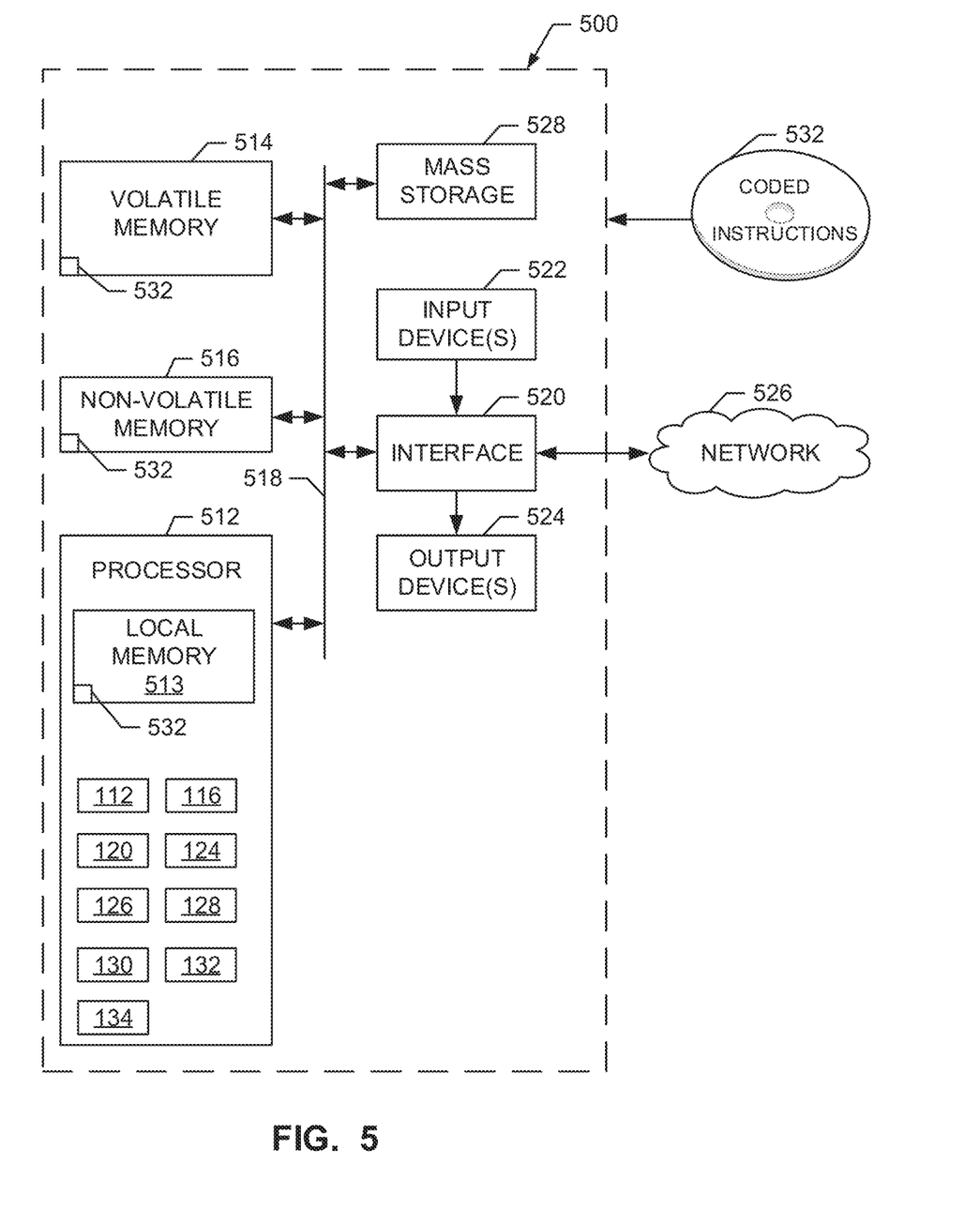
FIG. 5 is a block diagram of an example processor system structured to execute example machine readable instructions represented by FIGS. 3, 4A and/or 4B to implement the example image processing system of FIG. 1.

FIG. 5 is a block diagram of an example processor platform 500 capable of executing the instructions of FIGS. 3, 4A and 4B to implement the example image processing system 100 of FIG. 100. The processor platform 500 can be, for example, a server, a personal computer, a mobile device (e.g., a cell phone, a smart phone, a tablet such as an iPad™), a personal digital assistant (PDA), an Internet appliance, a gaming console, a personal video recorder, or any other type of computing device.

The processor platform 500 of the illustrated example includes a processor 512. The processor 512 of the illustrated example includes hardware that may implement one or more of the example image recognition application 112, the example pattern database 116, the example report generator 120, the example pattern generator 124, the example launch database 126, the example source image analyzer 128, the example pattern scale optimizer 130, the example rescaler 132, and/or the example scale corrector 134 of example image processing system 100 of FIG. 1. For example, the processor 512 can be implemented by one or more integrated circuits, logic circuits, microprocessors or controllers from any desired family or manufacturer.

The processor 512 of the illustrated example includes a local memory 513 (e.g., a cache). The processor 512 of the illustrated example is in communication with a main memory including a volatile memory 514 and a non-volatile memory 516 via a bus 518. The volatile memory 514 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 516 may be implemented by flash memory and/or any other desired type of memory device. Access to the main memory 514, 516 is controlled by a memory controller.

The processor platform 500 of the illustrated example also includes an interface circuit 520. The interface circuit 520 may be implemented by any type of interface standard, such as an Ethernet interface, a universal serial bus (USB), and/or a PCI express interface.

In the illustrated example, one or more input devices 522 are connected to the interface circuit 520. The input device(s) 522 permit(s) a user to enter data and commands into the processor 512. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 524 are also connected to the interface circuit 520 of the illustrated example. The output devices 524 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 520 of the illustrated example, thus, typically includes a graphics driver card, a graphics driver chip or a graphics driver processor.

The interface circuit 520 of the illustrated example also includes a communication device such as a transmitter, a receiver, a transceiver, a modem and/or network interface card to facilitate exchange of data with external machines (e.g., computing devices of any kind) via a network 526 (e.g., an Ethernet connection, a digital subscriber line (DSL), a telephone line, coaxial cable, a cellular telephone system, etc.).

The processor platform 500 of the illustrated example also includes one or more mass storage devices 528 for storing software and/or data. Examples of such mass storage devices 528 include floppy disk drives, hard drive disks, compact disk drives, Blu-ray disk drives, RAID systems, and digital versatile disk (DVD) drives.

Coded instructions 532 to implement the methods of FIGS. 3, 4A and 4B may be stored in the mass storage device 528, in the volatile memory 514, in the non-volatile memory 516, and/or on a removable tangible computer readable storage medium such as a CD or DVD.

From the foregoing, it will be appreciated that the above disclosed methods, apparatus/systems and articles of manufacture achieve better recognition rates than known image recognition technologies. Examples disclosed herein reduce (e.g., minimize) the differences in scales between patterns and the image (and/or objects in the image) to which the patterns are being compared. Examples disclosed herein also utilize optimized scales for the patterns, which are more reliable than the default scales typically assigned to a pattern. As a result, the initial basis for the scaling ratio is more accurate and leads to a better recognition process. Further, example systems and methods can be used to determine a more accurate estimate of the dimension(s) of a product, which is desirable for performing image recognition and for performing an in-store audit.

Although certain example methods, apparatus/systems and articles of manufacture have been disclosed herein, the scope of coverage of this patent is not limited thereto. On the contrary, this patent covers all methods, apparatus/systems and articles of manufacture fairly falling within the scope of the claims of this patent.

What is claimed is:

1. An apparatus comprising:
memory; and
at least one processor to:
determine optimized scale values for a first set of patterns of a plurality of patterns stored in a database, the optimized scale values determined based on scale estimates associated with the first set of patterns;
generate rescaled versions of the first set of patterns using the optimized scale values for the first set of patterns and based on a shelf image scale estimate of a shelf image; and
identify, using the rescaled versions of the first set of patterns, matches between the first set of patterns and objects appearing in the shelf image.

2. The apparatus of claim 1, wherein the at least one processor is to, prior to determining the optimized scale values, determine that each of the first set of patterns has a number of scale estimates that satisfy a threshold.

3. The apparatus of claim 2, wherein the plurality of patterns includes a second set of patterns having a number of scale estimates that do not satisfy the threshold.

4. The apparatus of claim 1, wherein the optimized scale values are a median of the scale estimates associated with respective ones of the first set of patterns.

5. The apparatus of claim 1, wherein the at least one processor is to determine deviation values between sizes of the rescaled versions of the first set of patterns and the objects matched with the first set of patterns.

6. The apparatus of claim 5, wherein the at least one processor is to determine a scale correction value for the shelf image scale estimate based on the deviation values, the scale correction value to be used during a subsequent analysis of the shelf image.

7. The apparatus of claim 6, wherein the at least one processor is to determine a new scale estimate for a first pattern of the first set of patterns based on a size of an object matched with a rescaled version of the first pattern and the scale correction value.

8. An apparatus comprising:
a memory; and
at least one processor to:
analyze a shelf image a first time to identify matches between patterns stored in a database and objects appearing in the shelf image based on a first shelf image scale estimate of the shelf image;
determine a second shelf image scale estimate for the shelf image based on deviation values between (a) sizes of a first set of objects detected in the shelf image and (b) a first set of the patterns matched with the first set of objects; and
analyze the shelf image a second time to identify matches between the patterns stored in the database and the objects appearing in the shelf image based on the second shelf image scale estimate.

9. The apparatus of claim 8, wherein the at least one processor is to determine the deviation values by determining a difference in pixel dimension of a first scaled version of a first pattern of the first set of the patterns and a first object of the first set of objects match with the first pattern.

10. The apparatus of claim 9, wherein the at least one processor is to, prior to analyzing the shelf image the first time, generate the first scaled version of the first pattern by rescaling the first pattern based on the first shelf image scale estimate.

11. The apparatus of claim 8, wherein the at least one processor is to, prior to analyzing the shelf image the first time, rescale the patterns to the first shelf image scale estimate.

12. The apparatus of claim 8, wherein the first set of the patterns have optimized scale values, and wherein the at least one processor is to, prior to analyzing the shelf image the first time, determine the optimized scale values for the first set of the patterns.

13. The apparatus of claim 12, wherein the optimized scale values for the first set of the patterns are based on arrays of scale estimates for respective ones of the first set of the patterns, wherein the first set of the patterns have a number of scale estimates that satisfy a threshold, and wherein a second set of the patterns have a number of scale estimates that do not satisfy the threshold.

14. An apparatus comprising:
memory; and
at least one processor to:
identify matches between stored patterns and objects detected in a shelf image, the shelf image having a shelf image scale estimate;
calculate deviation values between sizes of (A) a first set of the objects detected in the shelf image and (B) a first set of the stored patterns matched with the first set of the objects; and
reduce an error of the shelf image scale estimate by calculating a scale correction value for the shelf image scale estimate based on the deviation values.

15. The apparatus of claim 14, wherein the at least one processor is to calculate the deviation values by determining a difference in pixel dimensions of a first scaled version of a first pattern of the first set of the stored patterns and a first object of the first set of the objects matched with the first pattern.

16. The apparatus of claim 15, wherein the at least one processor is to generate the first scaled version of the first pattern by rescaling the first pattern based on the shelf image scale estimate.

17. The apparatus of claim 14, wherein the first set of the stored patterns have optimized scales.

18. The apparatus of claim 17, wherein the at least one processor is to determine the optimized scales for the first set of the stored patterns.

19. The apparatus of claim 17, wherein the optimized scales are a median of estimated scales for the first set of the stored patterns.

20. The apparatus of claim 14, wherein the stored patterns include a second set of the stored patterns, the first set of the stored patterns having a number of scale estimates that satisfy a threshold, the second set of the stored patterns having a number of scale estimates that do not satisfy the threshold.

* * * * *